No. 614,425. Patented Nov. 15, 1898.
F. A. FELDKAMP.
ACETYLENE GAS GENERATOR.
(Application filed Jan. 6, 1898.)

(No Model.) 2 Sheets—Sheet 1.

WITNESSES: INVENTOR:
Wm. H. Canfield, Jr. FRITZ A. FELDKAMP,
Marcy J. Truesdell BY Fred C. Graentzel,
ATTORNEY No. 614,425. Patented Nov. 15, 1898.
F. A. FELDKAMP.
ACETYLENE GAS GENERATOR.
(Application filed Jan. 6, 1898.)

(No Model.) 2 Sheets—Sheet 2.

WITNESSES:

INVENTOR:
FRITZ A. FELDKAMP,
BY
ATTORNEY

UNITED STATES PATENT OFFICE.

FRITZ A. FELDKAMP, OF NEWARK, NEW JERSEY.

ACETYLENE-GAS GENERATOR.

SPECIFICATION forming part of Letters Patent No. 614,425, dated November 15, 1898.

Application filed January 6, 1898. Serial No. 665,775. (No model.)

*To all whom it may concern:*

Be it known that I, FRITZ A. FELDKAMP, a subject of the Emperor of Germany, residing at Newark, in the county of Essex and State of New Jersey, have invented certain new and useful Improvements in Apparatus for Generating Acetylene Gas; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention has for its principal object to provide a novel construction of apparatus in which a small quantity of powdered or granulated calcium carbid is from time to time introduced into an intermittent supply of water to generate acetylene gas, the said gas being collected for consumption and the residue of decomposition in the form of slaked lime or lime-water passing off with the intermittent supply of running water.

The invention further consists in the novel construction of apparatus for producing acetylene gas in proper proportion to the consumption of the gas and in which the powdered or granulated calcium carbid is introduced into the water only as required and in which a fresh or running supply of water is permitted to pass intermittently into and out of the apparatus during the production of the gas.

The invention consists, furthermore, in the general arrangements and the novel constructions of the several parts to be used in connection with my present invention, all of which will be more fully described in the accompanying specification and finally embodied in the clauses of the claim.

The invention is illustrated in the accompanying drawings, in which—

Figure 1:
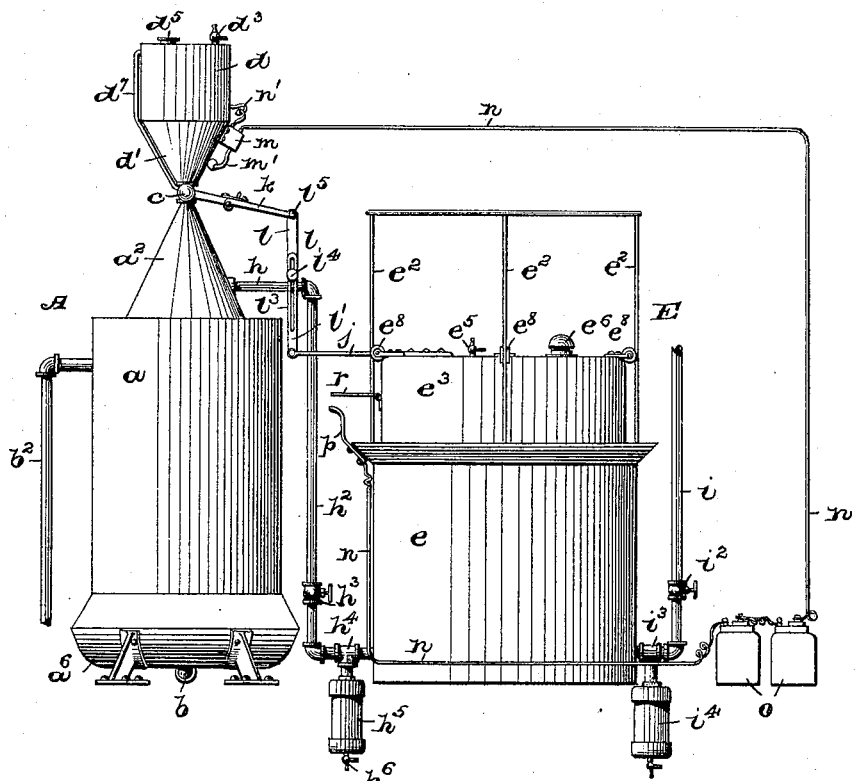
Figure 2:
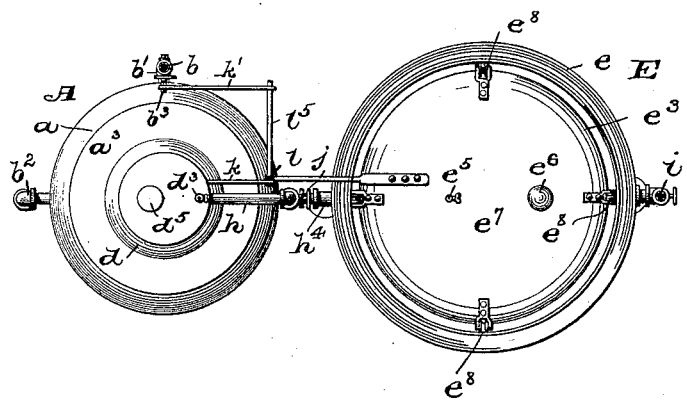
Figure 3:
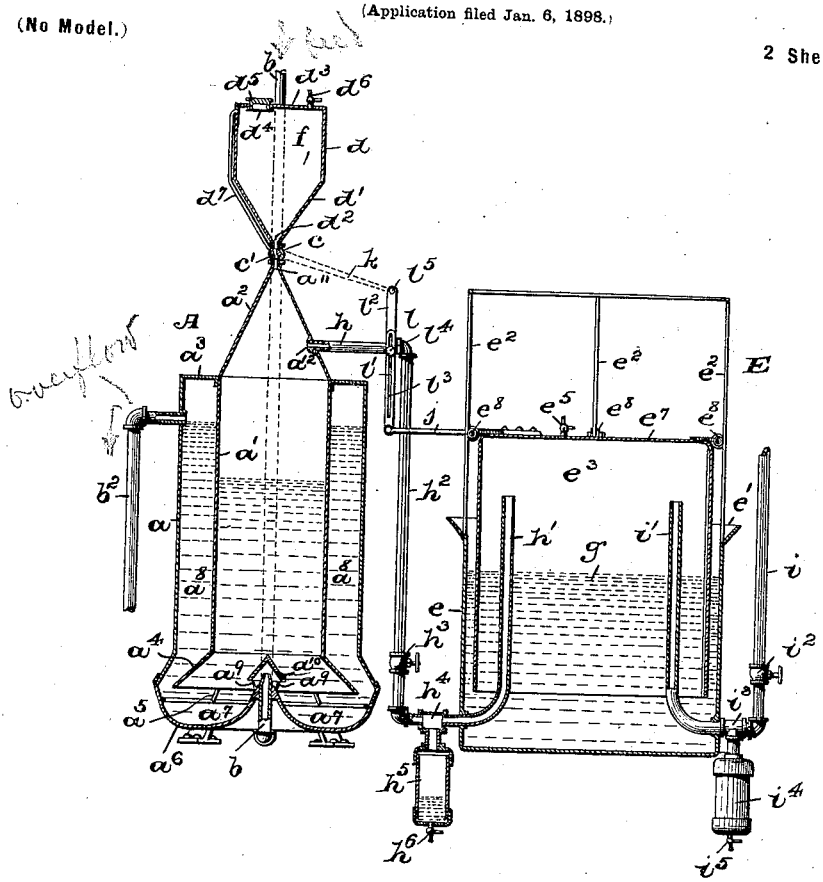
Figure 4:
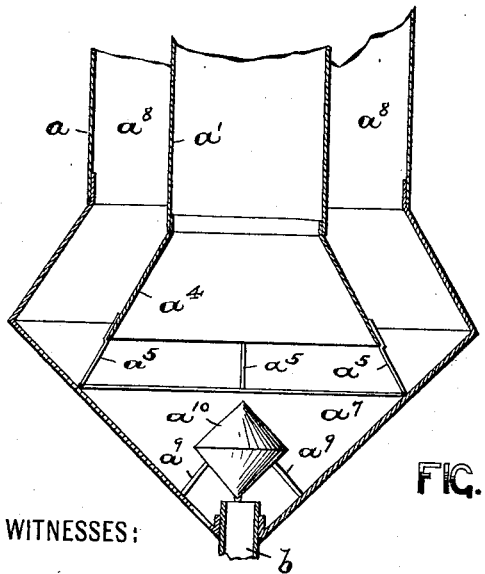
Figure 5:
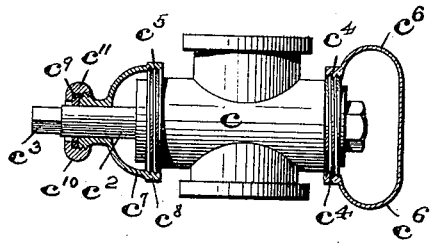

Figure 1 is a side elevation of the apparatus embodying the leading features of my present invention, and Fig. 2 is a plan or top view of the same. Fig. 3 is a vertical cross-section of the apparatus, illustrating the inner arrangement and construction of the gas-generating and gas-receiving tanks; and Fig. 4 is a detail section of the lower portion of the gas-generating tank, but of a slightly-modified form of construction. Fig. 5 is a detail view of a valve arranged between the carbid-supplying reservoir and the gas-generating tank.

Similar letters of reference are employed in all of the above-described views to indicate corresponding parts.

In said drawings, A indicates a suitable tank for generating the gas. Said tank consists, essentially, in the arrangement of an outer tank $a$ and an inner tank $a'$, said inner tank $a'$ having a funnel-shaped upper portion or hood $a^2$ arranged directly above and extending through an opening in the top $a^3$ of the tank $a$. The lower and open end of the tank $a'$ has its annular rim $a^4$ flaring outwardly, substantially as illustrated, and is provided with suitable braces or legs $a^5$, whereby said tank $a'$ can be centrally arranged and securely fastened within said outer tank $a$ by having its braces or legs $a^5$ soldered or otherwise secured to the inner surface of the tank $a$, as will be clearly understood.

The base or lower closed part $a^6$ of the outer tank $a$ is preferably curved, as illustrated in Figs. 1 and 3, or it may be made cone-shaped, as indicated in Fig. 4, whereby a communicating inlet $a^7$ is formed between the lower open part of the inner tank $a'$ and a chamber $a^8$, formed between the outer wall of the inner tank $a'$ and the inner wall of the outer tank $a$, as will be clearly evident from an inspection of Fig. 3. Said base $a^6$ is provided with a centrally-arranged hole, in which I have secured the outlet end of a water-supply pipe $b$, which extends up along one side of the outer tank $a$ and is provided with a valve $b'$ for admitting or shutting off the supply of water into the lower part of the tank A. Upon suitably-arranged braces $a^9$, which are secured to said base $a^6$, as clearly illustrated in Figs. 3 and 4, and arranged directly above the outlet end of the supply-pipe $b$ is a hood-like deflector $a^{10}$, which may be made conical or funnel-like, as illustrated in said Fig. 3, or it may be made of two oppositely-secured cones, as indicated in Fig. 4, or said deflector may be of any other well-known or desirable configuration. The purpose of this deflector is to deflect the water coming from the pipe $b$ directly into the inlet $a^7$, below the open part of the inner tank, whereby the water in the bottom of the outer tank $a$ is agitated and any residue of decomposition, as well as the lime-water, will be conducted by the current thus created into the chamber $a^8$ and out of the suitable overflow-pipe $b^2$ into the sewer-basins. The funnel-shaped top or hood $a^2$ of the inner tank $a'$ terminates in a mouth $a^{11}$, to which is secured in any well-known manner a cock or valve $c$, which is preferably in line with the water-cock $b'$ and has a movable part $c'$ rotatably arranged in the valve-casing and provided with a stem $c^2$, which extends through said casing and has on its free end a nut-like portion $c^3$, for the purposes to be hereinafter more fully described. Secured upon the top of said cock or valve $c$ in any well-known manner is a receptacle $d$, having a funnel-shaped part $d'$, terminating in an opening $d^2$, which communicates with the said cock or valve $c$, and in the closed top $d^3$ of the said receptacle $d$ is an opening $d^4$, and a cap $d^5$ for normally closing said opening, but which cap can be removed for admitting the powdered calcium carbid in said receptacle $d$. In said closed top $d^3$ there may be arranged a suitable cock $d^6$ to permit the escape of any gas that may be in the receptacle $d$ above the carbid. Connecting the upper part of said receptacle $d$ with the part $d'$ thereof, near the opening $d^2$, is a tube $d^7$, the purpose of which will be more fully described hereinafter.

E indicates a gas-receiver comprising a suitable water tank or reservoir $e$, which is open at the top, as at $e'$, and may be provided with any desirable number of uprights $e^2$, and $e^3$ is a vertically-moving gas-holder open at the bottom and having a closed top $e^7$, in which there may be a safety-valve $e^6$ and a petcock $e^5$. The open part of said holder $e^3$ is arranged in the water $g$ in the tank $e$, and on the top of said holder are a number of grooved wheels $e^8$, which are in rolling contact with the uprights $e^2$ to properly guide the vertical movement of the gas-holder as it moves up and down by the emission or admission of the gas into the holder.

Connected with an outlet $a^{12}$ in the cone-shaped top of the inner tank $a'$ is a suitable pipe $h$, which leads into the tank or reservoir $e$ at or near the bottom thereof and terminates in an upright pipe $h'$ above the water $g$ in the gas-holder $e^3$, substantially as represented. In that portion $h^2$ of the pipe $h$ between the gas-receiver E and the water-tank $a$ said pipe may be provided with a stop-cock $h^3$ for shutting off the communication between the tank $a'$ and the receiver E in case of repairs or for other reasons, and connected with a T-joint $h^4$ in the said pipe may be a drip-pot $h^5$ for catching any water caused by condensation, said pot $h^5$ being provided with an outlet-cock $h^6$ for drawing off the water from said pot when necessary. Leading from a point at or near the bottom of said water tank or reservoir $e$ is a pipe $i$, which contains the burner or burners for consuming the gas.

Said pipe $i$ is provided within the receiver E with an upright pipe $i'$, extending above the water $g$ and into the gas-holder $e^3$, the gas in said holder passing into the pipe $i'$ and then through the main pipe $i$ to the burners. Said pipe $i$ may also be provided with a shut-off cock $i^2$ and a T-joint $i^3$, with which is connected a drip-pot $i^4$ for catching any condensed water that may be in the pipe $i$. An outlet-cock $i^5$ may be arranged in the lower part of said drip-pot $i^4$.

Pivotally connected with an arm $j$, preferably secured to the top of the gas-holder $e^3$, is an adjustable link $l$, consisting, essentially, of a pair of rods $l'$ and $l^2$, said rod $l'$ having a long slot or opening $l^3$, whereby it can be adjustably clamped or secured in position to the rod $l^2$ by means of a tightening-screw $l^4$, which passes through said slot and screws into the said rod $l^2$ in the usual and well-known manner. Pivotally secured to one end of a horizontally-arranged bar or arm $l^5$, secured to the upper end of said rod $l^2$, is a suitable lever $k$, which is operatively connected with the nut portion $c^3$ on the stem $c^2$ of the movable part of the cock or valve $c$. A second rod $k'$ is secured to the end $l^6$ of the bar or arm $l^5$, and is also operatively connected with the valve-stem $b^3$ of the water cock or valve $b'$ in the supply-pipe $b$, which leads into the bottom of the gas-generator A.

The operation of the apparatus for generating acetylene gas is as follows: Suppose the two tanks $a$ and $a'$ and the gas-receiver E have been properly supplied with the water and the cocks or valves $c$ and $b'$ are in their closed positions. The receptacle $d$ is then filled with the finely-powdered calcium carbid and the cap $d^5$ again closed. The gas-holder $e^3$ of the receiver E then rests in about the position indicated in Fig. 3 within said tank or reservoir $e$. The link connection $l$ is now properly adjusted, and connection is made, by means of the levers or rods $k$ and $k'$, with the respective cocks or valves $c$ and $d'$, both valves being open, owing to the positions of the parts of the valve-operating mechanism. The finely-powdered calcium carbid now passes from the receptacle $d$ slowly and in small quantity through the open cock or valve $c$ into the water in the inner tank $a'$, where it is immediately decomposed, and the generated acetylene gas passes through the pipe $h$ into the gas-receiver E, from which it can be withdrawn through the pipe $i$ for consumption. During this time the cock or valve $b'$ in the pipe $b$ is open, and a constant and fresh supply of running water enters the gas-generator A, through which it flows in the manner hereinabove described and carries off all the lime-water or the slaked lime through the overflow-pipe, thereby leaving the gas-generator entirely free from any residue of decomposition. Should at any time the volume of gas generated in the tank $a'$ be greater than the consumption, it will be evident that the valve-controlling mechanism will be immediately operated by the rising parts connected with the gas-receiver E, and both valves $c$ and $b'$ will again be closed, thereby shutting off the supply of the carbid into the tank $a'$ and also the supply of water into the bottom of the tank $a$. As the gas is withdrawn from the gas-holder E the valve-controlling mechanism will again open the respective valves $c$ and $b'$, and the operation of admitting the carbid and water into the gas-generator A is repeated, the lowering of the gas-holder $e^3$ again causing the link connection $l$ and levers $k$ and $k'$ to actuate the movable part $c'$ of the cock or valve $c$ and the movable part of the valve $b'$ in the opposite directions, thereby opening said cocks or valves, and a fresh supply of powdered calcium carbid and water is at once admitted into the gas-generator A in the manner as hereinbefore fully set forth.

In order that there may be no escape of the acetylene gas from the ends of the casing of the valve or cock $c$, I have provided the valve-casing at its ends with the screw-threads $c^4$ and $c^5$. Upon the thread $c^4$ I screw a metal or other suitable cap $c^6$, and upon the thread $c^5$ I screw a box $c^7$, having a threaded sleeve $c^8$, through which the valve-stem $c^2$ operates. Upon said stem I arrange a packing $c^9$ and a collar or sleeve $c^{10}$, having a flange $c^{11}$, whereby when said sleeve is tightened down upon the sleeve $c^8$ a suitable stuffing-box is provided and any gas from the funnel-shaped top with which said valve-casing is connected can pass into said cap $c^6$ or the box $c^7$, but cannot escape into the air, as will be readily seen from an inspection of Fig. 5.

In order that the finely-powdered calcium carbid may not clog up the passage through the cock or valve $c$, I may arrange on the outside of the funnel-shaped portion of the receptacle $d$ a vibrating mechanism provided with a means for rapping the side of the receptacle, and thereby insuring the passage of the powdered material through the valve or cock. This device may be of any ordinary mechanical construction or an ordinary electric vibrator.

I have illustrated in connection with the apparatus represented in Fig. 1 an electric vibrator $m$, having a vibratory arm $m'$. This device is in circuit by means of the wire $n$ and the battery or batteries $o$. Attached to the tank $e$, but insulated therefrom, is an arm $p$, to which the wire $n$ is attached, and on the gas-holder $e^3$ is a contact-arm $r$, whereby when there is but little gas in the holder $e^3$ contact will be established between the arm $r$ and the arm $p$ and a complete electric circuit established through the wire $n$ and battery $o$ through the vibrator $m$ and a wire $n'$, connecting the same with the receptacle $d$. The arm $m'$ will move rapidly and strike against the side of the receptacle $d$, and the powdered calcium carbid will not clog up the duct in the valve. This device can also be used as an indicator to announce the fact that the receptacle $d$ has been entirely emptied of its contents, when it will act in a like manner.

From the above description it will be evident that I have devised a simple and operative apparatus for generating acetylene gas in proper proportion to the consumption of the gas, and the danger of explosion, owing to a greater volume of gas than required, is entirely obviated.

I am fully aware that many changes may be made in the arrangements and combinations of parts and the several operating mechanisms, as well as in the details of the construction thereof, without departing from the scope of my invention. Hence I do not limit my invention to the exact arrangements and combinations of parts nor to the details of the construction herein described, and illustrated in the accompanying drawings.

Having thus described my invention, what I claim is—

1. In an apparatus for generating acetylene gas, the combination, with a generating apparatus, of a receptacle containing powdered calcium carbid arranged directly above said apparatus, a means of communication between said receptacle and generator, a cock or valve between said receptacle and generator, a water-inlet pipe at or near the bottom of said generator, and an overflow-pipe, a cock or valve in said inlet-pipe, and means for operating said cocks or valves simultaneously, substantially as and for the purposes set forth.

2. In an apparatus for generating acetylene gas, the combination, with a generating apparatus, of a receptacle containing powdered calcium carbid arranged directly above said apparatus, a means of communication between said receptacle and generator, a cock or valve between said receptacle and generator, a water-inlet pipe at or near the bottom of said generator, and an overflow-pipe, a cock or valve in said inlet-pipe, and means for operating said cocks or valves simultaneously, and a gas-receiver connected with said generator, substantially as and for the purposes set forth.

3. In an apparatus for generating acetylene gas, the combination, with a gas-receiver, comprising a water-tank and a water-sealed gas-holder vertically movable in said water-tank, of a gas-generating apparatus, a receptacle containing powdered calcium carbid arranged directly above said generator, a pipe connection between said generator and gas-receiver, a means of communication between said carbid-receptacle and generator, a cock or valve between said receptacle and generator, a water-inlet pipe at or near the bottom of said generator, and an overflow-pipe, a cock or valve in said inlet-pipe, and mechanism connected with said cocks or valves and controlled by the vertically-moving gas-holder to open and close said cocks or valves simultaneously, substantially as and for the purposes set forth.

4. In an apparatus for generating acetylene gas, the combination, with a gas-receiver, comprising a water-tank and a water-sealed gas-holder vertically movable in said water-tank, of a gas-generating apparatus, a receptacle containing powdered carbid arranged directly above said generator, a pipe connection between said generator and gas-receiver, a means of communication between said carbid-receptacle and generator, a cock or valve between said receptacle and generator, a water-inlet pipe at or near the bottom of said generator, and an overflow-pipe, a cock or valve in said inlet-pipe, and mechanism connected with said cocks or valves and controlled by the vertically-moving gas-holder to open and close said cocks or valves simultaneously, consisting, essentially, of an arm on said gas-holder, a link connection $l$ and a pair of levers $k$ and $k'$ connected, respectively, with the cock or valve between the carbid-receptacle and gas-generator, and the cock or valve in the inlet-pipe, substantially as and for the purposes set forth.

5. The herein-described apparatus for generating acetylene gas, comprising an outer tank $a$ having a closed top, an inner tank $a'$, a funnel-shaped top or hood $a^2$ on said tank $a'$ extending through said closed top, said tank $a'$ being open at the bottom, a carbid-containing receptacle $d$ arranged on said top or hood $a^2$, and a cock or valve between said receptacle and said top or hood, a water-inlet pipe in the bottom of said tank $a$ and an overflow-pipe, and a water-deflector within said apparatus and above the discharge-opening of said inlet-pipe, substantially as and for the purposes set forth.

6. The herein-described apparatus for generating acetylene gas, comprising an outer tank $a$ having a closed top, an inner tank $a'$, a funnel-shaped top or hood $a^2$ on said tank $a'$ extending through said closed top, said tank $a'$ being open at the bottom, a carbid-containing receptacle $d$ arranged on said top or hood $a^2$, and a cock or valve between said receptacle and said top or hood, a water-inlet pipe in the bottom of said tank $a$, and an overflow-pipe, a gas-receiver connected with said generator, and an operative means between said gas-receiver and said cocks or valves for opening and closing said cocks or valves, substantially as and for the purposes set forth.

7. The herein-described apparatus for generating acetylene gas, comprising the outer tank $a$ having a closed top, an inner tank $a'$, a funnel-shaped top or hood $a^2$ on said tank $a'$ extending through said closed top, said tank $a'$ being open at the bottom, a carbid-containing receptacle $d$ arranged on said top or hood $a^2$, and a cock or valve between said receptacle and said top or hood, a water-inlet pipe in the bottom of said tank $a$ and an overflow-pipe, and a water-deflector within said apparatus and above the discharge-opening of said inlet-pipe, a gas-receiver connected with said generator, and an operative means between said gas-receiver and said cocks or valves for opening and closing said cocks or valves, substantially as and for the purposes set forth.

In testimony that I claim the invention set forth above I have hereunto set my hand this 5th day of January, 1898.

FRITZ A. FELDKAMP.

Witnesses:
 FREDK. C. FRAENTZEL,
 WM. H. CAMFIELD, Jr.